(12) United States Patent
Murakami

(10) Patent No.: US 8,876,578 B2
(45) Date of Patent: Nov. 4, 2014

(54) PORTABLE WORKING MACHINE

(75) Inventor: Takuhiro Murakami, Hitachinaka (JP)

(73) Assignee: Hitachi Koki Co., Ltd., Tokyo (JP)

(*) Notice: Subject to any disclaimer, the term of this patent is extended or adjusted under 35 U.S.C. 154(b) by 267 days.

(21) Appl. No.: 13/458,577

(22) Filed: Apr. 27, 2012

(65) Prior Publication Data

US 2012/0276823 A1 Nov. 1, 2012

(30) Foreign Application Priority Data

Apr. 29, 2011 (JP) .................................. 2011-102557

(51) Int. Cl.
*B24B 55/04* (2006.01)
*B23Q 11/06* (2006.01)
*B28D 7/00* (2006.01)

(52) U.S. Cl.
CPC . *B28D 7/00* (2013.01); *B23Q 11/06* (2013.01)
USPC ............ 451/451; 451/311; 451/452; 451/455

(58) Field of Classification Search
USPC .................... 451/311, 451, 452, 455
See application file for complete search history.

(56) References Cited

U.S. PATENT DOCUMENTS

| 4,905,424 | A  | * | 3/1990  | Nagashima et al. | .......... 451/452 |
| 7,131,897 | B2 | * | 11/2006 | Crover           | .......... 451/311 |
| 8,011,357 | B2 | * | 9/2011  | Johansson        | .......... 30/124  |
| 8,272,134 | B2 | * | 9/2012  | Soika et al.     | .......... 30/390  |

FOREIGN PATENT DOCUMENTS

JP          10-086136          4/1998

* cited by examiner

*Primary Examiner* — Lee D Wilson
*Assistant Examiner* — Shantese McDonald
(74) *Attorney, Agent, or Firm* — McDermott, Will & Emery LLP

(57) ABSTRACT

A portable working machine is provided with a wheel guard partially covering a wheel rotated by a drive source such as an engine, and the wheel guard is retained by a retaining portion of an arm via rubber dampers serving as elastic members. Concave-convex portions are formed on the rubber dampers, a convex-concave portion corresponding to the concave-convex portions is formed in the wheel guard side, and the wheel guard is retained by the arm so that the concave-convex portions are engaged with the convex-concave portion.

17 Claims, 8 Drawing Sheets

PORTABLE WORKING MACHINE

CROSS-REFERENCE TO RELATED APPLICATION

The present application claims priority from Japanese Patent Application No. 2011-102557 filed on Apr. 29, 2011, the content of which is hereby incorporated by reference into this application.

TECHNICAL FIELD OF THE INVENTION

The present invention relates to the structure of a portable working machine and particularly relates to a portable working machine having a wheel guard which guards a wheel serving as a rotating-type distal-end tool.

BACKGROUND OF THE INVENTION

In a portable working machine represented by an engine cutter, a wheel guard is provided so that scattering of cut powder to the surrounding area is prevented during a grinding operation. For working machines to which a wheel guard is provided, it is required to prevent a situation in which the wheel guard is rotated and displaced when a part (piece) of the wheel guard that is damaged during the grinding operation collides with the wheel guard.

Therefore, to prevent the wheel guard from rotating more than necessary, attaching a stopper for preventing rotation like Japanese Patent Application Laid-Open Publication No. 10-86136 has become common. Furthermore, increasing the thickness of the wheel guard or manufacturing with a material having high strength have been widely implemented.

SUMMARY OF THE INVENTION

When manufacturing a wheel guard using a non-ferrous metal such as an aluminum material or a resin is used to reduce the weight of the wheel guard used in a potable working machine, a countermeasure against a problem of reduction in strength of the wheel guard is important. Even when breakage is prevented by increasing the strength of the wheel guard, if a piece of damaged wheel collides with the wheel guard and the shock of the collision is directly applied to a stopper and it causes breakage or plastic deformation of the stopper, the role of the wheel guard is not fulfilled. Furthermore, if, for example, when the wheel guard rises over the stopper upon breakage of the blade and rotates by more than its predetermined pivoting angle, rotation of the wheel guard cannot be prevented by the stopper.

On the other hand, it is also conceivable to firmly manufacture the wheel guard with a material such as iron in order to solve the above-described problem. However, in that case, the weight of the wheel guard is increased and may lower the workability of the portable working machine. Moreover, although the strength of the wheel guard per se is increased by changing the material, the effect of preventing rotation of the wheel guard by the stopper remains insufficient, and thus it has been necessary to improve the strength the rotation preventing mechanism per se.

The typical ones of the inventions disclosed in the present application will be briefly described as follows.

According to a feature of the present invention, a portable working machine has: an engine (drive source) of, for example, two-stroke or four-stroke; a spindle that rotates when power of the drive source is transmitted to the spindle; an arm that supports the spindle; a working wheel fixed to the spindle; and a wheel guard partially covering the wheel and capable of shifting a fixed position with respect to the arm by a predetermined rotation angle. In the portable working machine, the wheel guard is retained by the arm via an elastic member; a concave-convex portion is formed on the elastic member; a convex-concave portion corresponding to the concave-convex portion is formed on the wheel guard. The wheel guard is retained by the arm so that the concave-convex portion and the convex-concave portion are engaged with each other. The concave-convex portion and the convex-concave portion mean that they have symmetric shapes so as to fit with each other. Simple shapes such as a concave portion serving as one of them and a convex portion serving as the other one may be used, or a combination of complex concave-convex shapes may be used.

According to another feature of the present invention, a cylindrical flange in contact with the elastic member is provided in the vicinity of a radially innermost periphery of the wheel guard; a convex-concave portion is formed on an inner peripheral part of the flange; the elastic member has a shape covering part of or all of the outer periphery and a lateral side of the flange; the concave-convex portion corresponding to the convex-concave portion of the flange is formed on an outer peripheral part of the elastic member; and the wheel guard is sandwiched by the arm and an attachment member with the elastic member interposed therebetween. A plate made of metal is interposed in a contact region of the elastic member and the wheel guard; and, when the wheel guard is to be relatively moved with respect to the arm, a relative positional relation of any of the elastic member, the plate, and the wheel guard is changed.

According to further another feature of the present invention, the wheel guard includes: two plates covering both side surfaces of the wheel; a cover part connecting the two plates; and the flange fixed to either one of the plates, the plate and the flange being fixed by welding or bolt fastening. The amount of projection of the flange with respect to an outer peripheral surface and an inner peripheral surface of the plate is larger than an overlay height of the flange and the plate. The outer peripheral part of the flange has a stepped shape, the amount of projection of the flange projected from the outer peripheral surface and the inner peripheral surface of the plate is higher (larger) than the overlay height of the flange and the plate, and the upper end surface and the lower end surface of the inner peripheral part of the flange have the same convex-concave shape.

According to further another feature of the present invention, the plate to which the flange is attached is provided with at least two or more stepped portions; and the stepped portion is provided with a stopper for restricting a pivoting range of the wheel guard with respect to the arm. The stopper includes a base part and an elastic member being attached so as to cover a part or all of an outer periphery of the base part. The base part is provided with a groove continuous in a circumferential direction, and the elastic member is a stopper ring engaged with the groove. The stopper ring is disposed so as to be first brought into contact with the arm when the wheel guard rotates. For example, the outermost diameter of the base part is smaller than the outermost diameter of the stopper ring.

The effects obtained by typical aspects of the present invention will be briefly described below.

BRIEF DESCRIPTIONS OF THE DRAWINGS

DESCRIPTIONS OF THE PREFERRED EMBODIMENTS

[First Embodiment]

Figure 1:
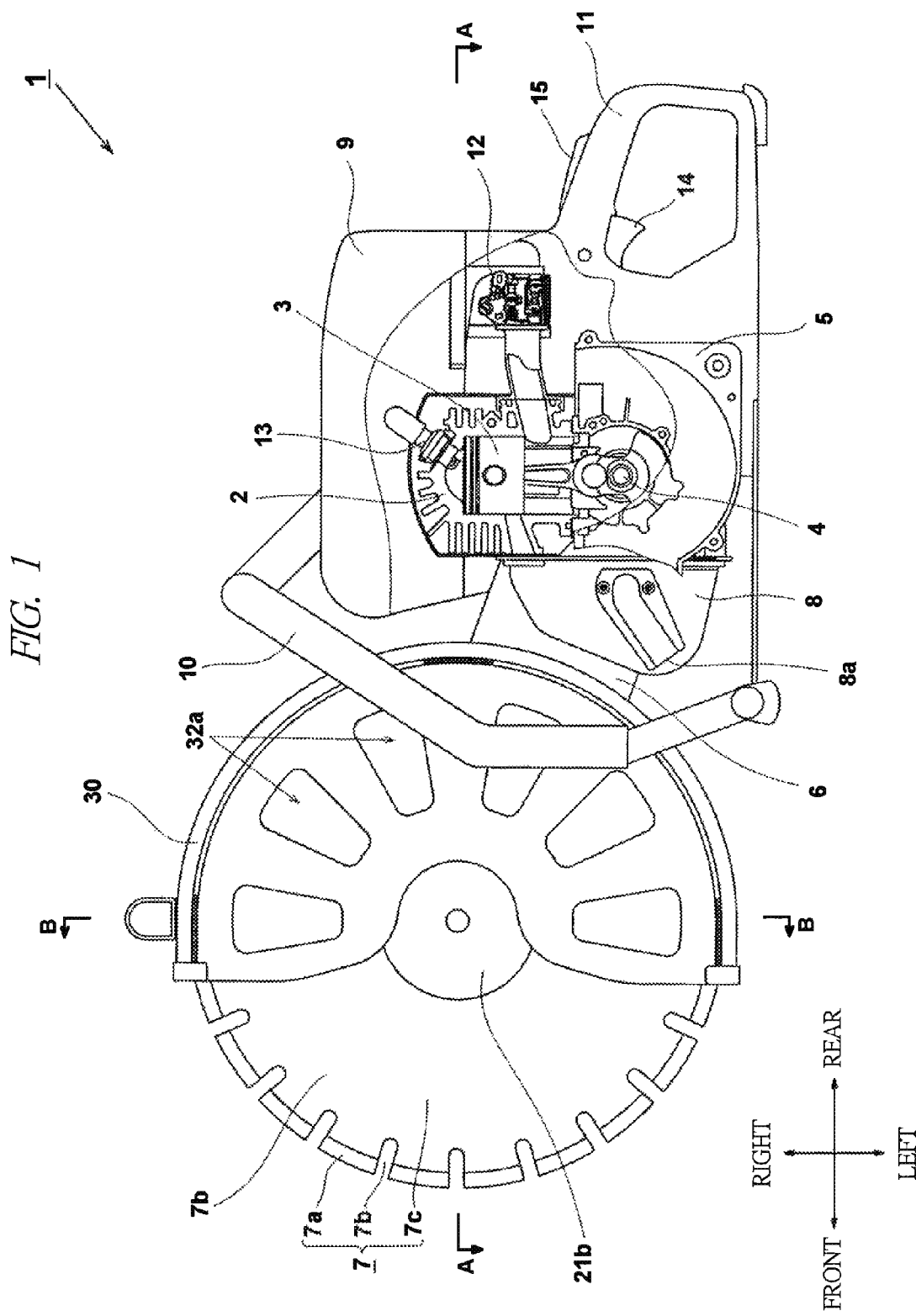
FIG. 1 is a side view of a portable working machine according to an embodiment of the present invention and is showing a part of the portable working machine as a cross-sectional view.

Hereinafter, embodiments of the present invention will be described based on the drawings. In the present embodiment, an engine cutter as an example of a portable working machine having a rotating tool will be described. In the drawings hereinafter, the same parts are denoted by the same reference numerals, and repeated explanations thereof will be omitted. In the present specification, the front-back, left-right, and top-bottom directions are explained on the assumption that they are those shown in the drawings.

An engine cutter 1 is a working machine, which rotates a blade 7 serving as a distal-end tool by using the power from, for example, two-stroke or four-stroke engine (drive source). In the front side of the engine cutter 1, the blade (wheel) 7 of a rotating type is provided; and, in the rear side of the engine cutter 1, the engine serving as a drive source is provided. A rotating shaft (spindle, which will be described later) of the blade 7 is provided in parallel with a crankshaft 4 of the engine. The engine of the present embodiment is attached to a crank case 5 so that a cylinder 2 is perpendicular, and a piston 3 reciprocates in the top-bottom direction in the cylinder 2. The crankshaft 4 is disposed so as to be parallel to the rotating shaft of the blade 7, driving power is output from one of the ends thereof, and the driving power is transmitted to the blade 7 via a centrifugal clutch, which will be described later. The engine in the present embodiment is a two-stroke engine using a mixed fuel, and a spark plug 13 for combusting a mixed gas is provided at an upper part of the cylinder 2. An arm 6 (arm) extending to the front side is attached to the crank case 5 of the engine, and the arm 6 retains the blade 7 so that the blade 7 fixed to the spindle, which will be described later, is rotatable in the vicinity of a front end.

The engine is housed in a housing 9 formed of, for example, a synthetic resin, and a rear handle 11 to be held by a worker is provided in the rear side of the housing 9. The rear handle 11 is held by the worker with his/her right hand and is formed of a synthetic resin to be integral with the housing 9. A throttle trigger 14 for adjusting the rotating speed of the engine is provided on the lower side of the rear handle 11, and a lock lever 15 is provided on the upper side of the rear handle 11. The throttle trigger 14 can be subjected to a pulling operation only in the state in which the rear handle 11 is held and the lock lever 15 is pushed. A front handle 10 is attached to the front side of the housing 9. The front handle 10 is a handle to be held by the worker with his/her left hand and can be subjected to work not only when the engine cutter 1 is in an upright state but also when the engine cutter 1 is inclined to left or right or horizontal. Therefore, in order to increase the degree of freedom of the holding position, the front handle 10 is extended from the left lower side of the housing 9 so as to surround the rear side of a wheel guard 30 and fixed to a right-side part of the housing 9. Note that, the rear handle 11 may be held by the worker's left hand and the front handle 10 may be held by the worker's right hand.

A carburetor 12 is provided behind the cylinder 2 and in a rear part of the housing 9. An air cleaner for cleaning intake air is provided in the vicinity of a part above the carburetor 12, although it is not shown in the drawing. A muffler 8 is provided between the cylinder 2 the blade 7. The muffler 8 is a silencing device directly fixed to an air-discharge port of the cylinder 2 by bolts, etc., and the muffler 8 is provided with a discharge opening 8a for discharging a discharge gas obliquely downward toward the front side. The discharge gas flows in the direction of a tangent line of an outer peripheral part of the wheel guard 30. When the discharging direction of the discharge gas is set in this manner, the discharge gas can be discharged toward the side to be away from the worker.

The blade 7 is a diamond cutter (diamond wheel), in which a diamond layer 7a is formed on a lateral surface in the vicinity of the outer periphery of a circular board 7c, and a plurality of slits 7b are formed in the board 7c in the radially-outside of the board 7c in order to increase a cooling effect. About half of the lateral face of the blade 7 is covered with a wheel guard 30 made of metal to prevent cut powder from hitting the worker. The wheel guard 30 is fixed to the arm 6, but is retained so as to be coaxially rotatable with the blade 7 by a predetermined angle. The wheel guard 30 can be moved, for example, from the position shown in FIG. 1 by about 30 degrees toward the same direction as the rotating direction of the blade 7 and by about 60 degrees toward the opposite direction by moving an angle adjusting lever 18 in the rotating direction. The pivoting angle can be further increased by adjusting the sizes (particularly, sizes in the radial direction) and attachment positions of stoppers 50 and 55 and the width of the arm 6. The vicinity of the radial center of a left-side plate of the wheel guard 30 is semi-circularly hollowed for fixing an attachment bolt (described later), which penetrates through a wheel washer 21a (FIG. 2) of the blade 7.

Figure 2:
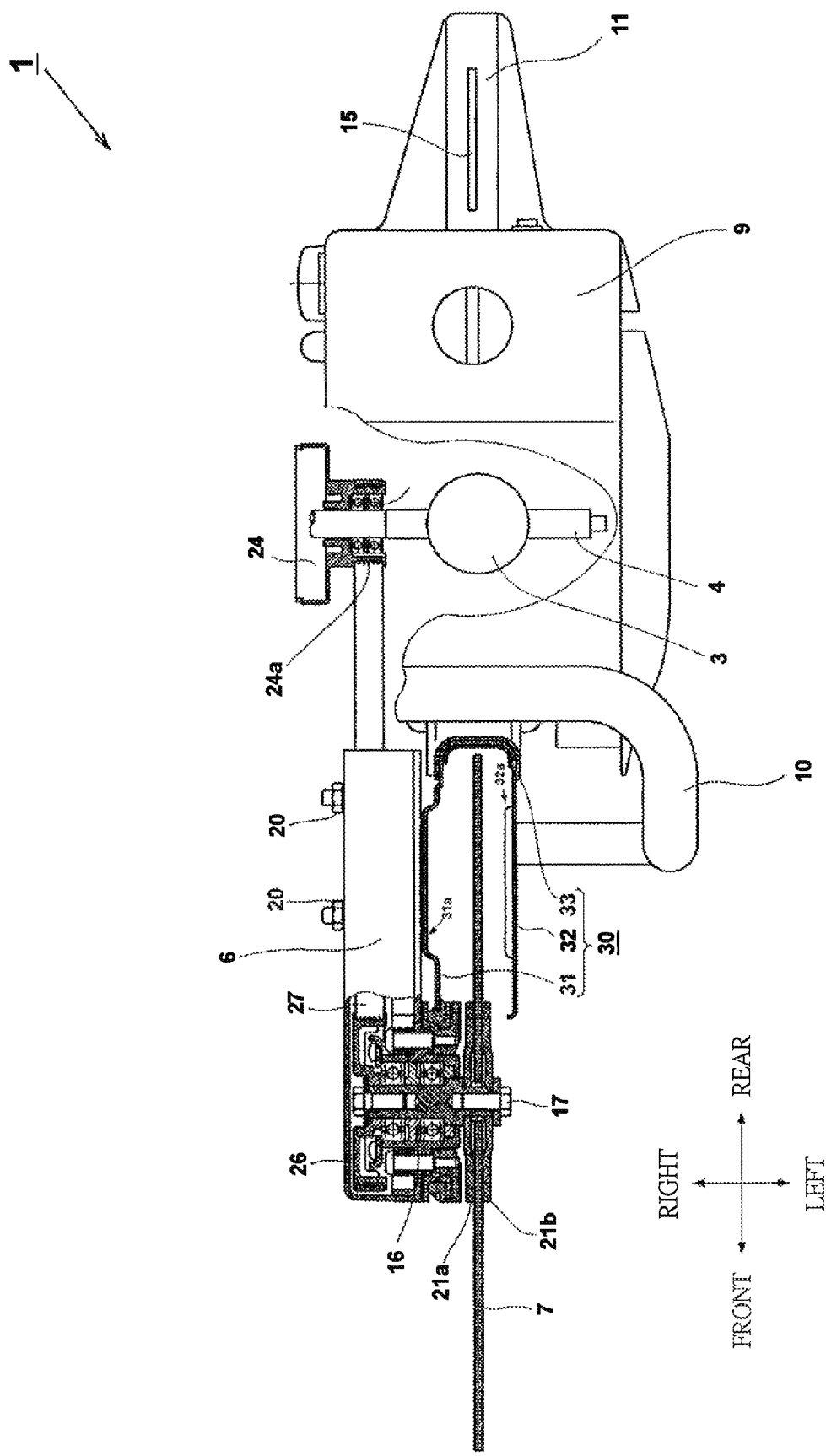
FIG. 2 is a top view of the portable working machine according to the embodiment of the present invention, partially showing the cross section of an A-A part of FIG. 1.

FIG. 2 is a top view of the portable working machine according to the embodiment of the present invention and is a drawing partially showing the cross section of the A-A part of FIG. 1. The arm 6, which rotatably retains the blade 7, is fixed to the engine or the housing 9 with two bolts 20. The spindle 16 is rotatably retained at a distal end of the arm 6 via two sets of bearings. A pulley 26 is provided at a right-side end of the spindle 16, and the rotative force of the crank shaft 4 is decelerated at a predetermined speed reducing ratio by a belt 27 wound between the pulley 26 and a pulley 24a provided at an end of a clutch housing 24 and transmitted to the spindle 16.

The blade 7 is fixed to a left-side end of the spindle 16 with an attachment bolt 17. The blade 7, has the circular plate 7c and a through hole for allowing the attachment bolt 17 to penetrate therethrough is formed at the center of the circular board 7c. The blade 7 is fixed by being sandwiched by two disk-like wheel washers 21a and 21b, which are arranged in the periphery of the through hole, from both the left and right. The wheel washers 21a and 21b are, for example, made of a metal such as iron or made of aluminum, etc.

An approximately half of the rear side of a lateral-surface part and an outer peripheral part of the blade 7 are covered with the wheel guard 30. The wheel guard 30 is mainly composed of three members of: a right-side plate 31 covering the right-side lateral surface of the blade 7; a left-side plate 32 covering the left-side lateral surface of the blade 7; and an outer-periphery coupling part (covering portion) 33 covering the outer peripheral part of the blade 7 and coupling the right-side plate 31 and the left-side plate 32 to each other. The right-side plate 31, the left-side plate 32, and the outer-periphery coupling part 33 can be manufactured by, for example, pressing plates of a metal such as iron, and each of the plates is e joined by brazing or welding. Six pieces of stepped portions 32a (see FIG. 1 for overall shape) are formed in the circumferential direction of the left-side plate 32. The stepped portions 32a are formed by deforming the surface of the left-side plate 32 into a convex shape or concave shape in order to improve the overall strength of the left-side plate 32. In the present embodiment, a part of the left-side plate 32 is projected toward the blade 7 side (inner side viewed from the left-side plate) so that the stepped portion 31a in a concave shape when viewed from the outer side (left side) of the left-side plate 32 is formed. However, this may be reversed to make a stepped portion in a convex shape when viewed from the outer side (left side) of the left-side plate 32.

Similarly, six pieces of stepped portions 31a (see FIG. 6 for overall shape) are formed in the circumferential direction of the right-side plate 31. It is preferred that the stepped portions 31a is formed in a convex shape when viewed from the outer side (right side) of the right-side plate 31. This is for attaching later-described stoppers 50 and 56 to the stepped portions 31a. As is understood from the drawing, the piston 3 moves in the perpendicular direction (top-bottom direction), the crankshaft 4 is horizontally disposed so as to extend to the left and right, and the spindle 16 is horizontally disposed so as to be parallel to the crankshaft 4. When the positional relation of the spindle 16 and the crankshaft 4 is set in this manner, the driving force generated by the engine can be easily transmitted to the spindle 16 with the belt 27 wound around the pulleys 24a and 26. The rotative force of the crankshaft 4 is connected or cut off by a centrifugal clutch, which is not illustrated, disposed in the clutch housing 24.

Figure 3:
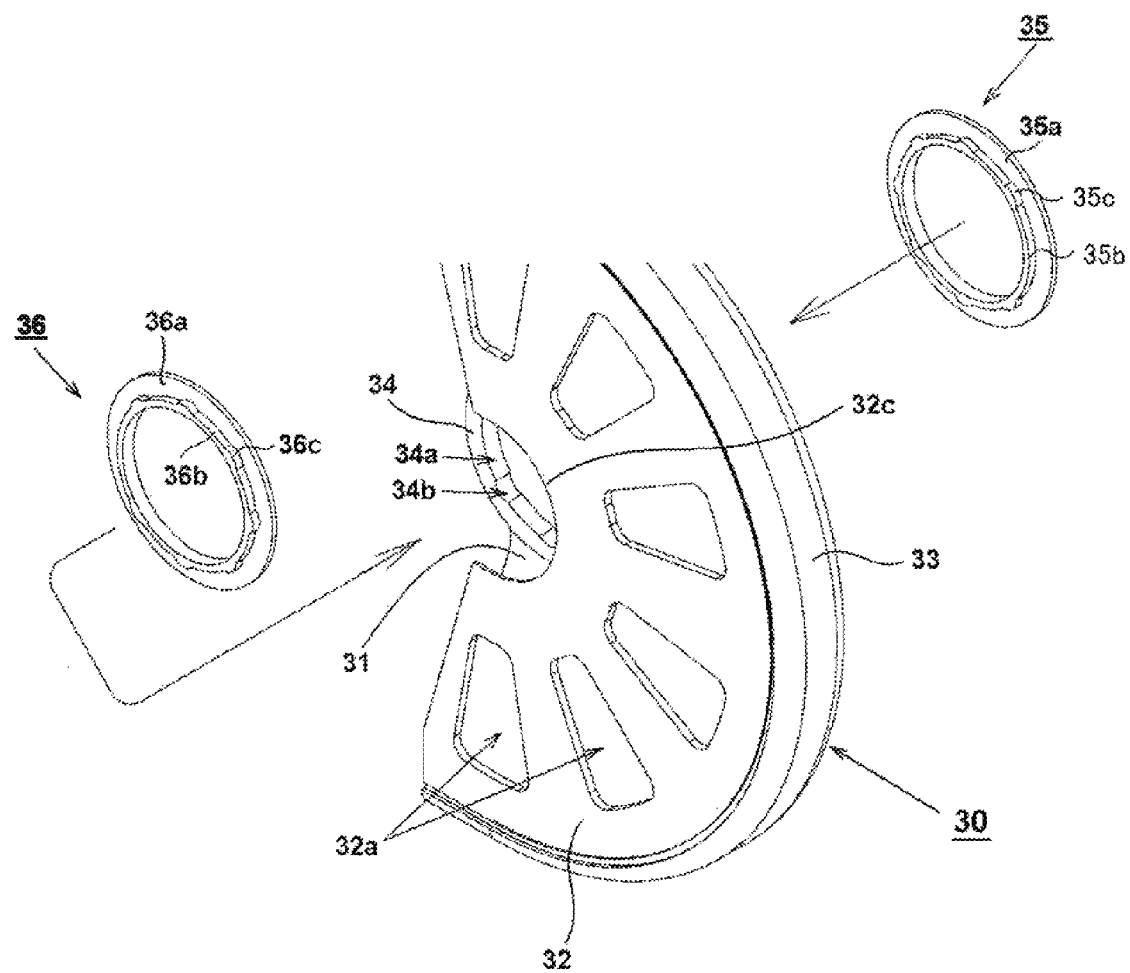
FIG. 3 is a partial perspective view showing an attachment structure of a wheel guard 30 shown in FIG. 1.

FIG. 3 is a side view showing an attachment structure of the wheel guard 30. The wheel guard 30 is attached to the arm 6 via a flange 34 fixed to the right-side plate 31. The flange 34 is a metal member having a substantially L-shape as a cross-section in a radial direction and includes concave portions 34b serving as concave-convex portions formed at a plurality of locations in the circumferential direction of an inner peripheral wall 34a. A right-side rubber damper 35 is attached to the right side of the flange 34. The right-side rubber damper 35 has a substantially L-shape as a cross-sectional shape in a radial direction and includes: an annular portion 35a having a predetermined area in a radial direction; a cylindrical portion 35b extending in the axial direction from an inner peripheral part of the annular portion 35a; and a plurality of convex portions 35c provided in the circumferential direction in the outer peripheral side of the cylindrical portion. The convex portions 35c are the concave-convex portions formed to correspond to the concave-convex portions (concave portions 34b) of the flange 34, and the right-side rubber damper 35 is retained by the engagement of the concave-convex portions and the convex-concave portions so that the damper is not relatively rotated with respect to the flange 34.

Similarly, a left-side rubber damper 36 is provided on the left side of the flange 34. The right-side rubber damper 35 and the left-side rubber damper 36 have the same shape and are the same members disposed on the opposite sides to each other. The left-side rubber damper 36 includes an annular portion 36a, a cylindrical portion 36b, and convex portions 36c. In this manner, the flange 34 is sandwiched and held by the right-side rubber damper 35 and the left-side rubber damper 36. In addition, as the concave portion 34b of the flange 34 and the convex portions 35c and 36c of the right-side rubber damper 35 and the left-side rubber damper 36 are joined, when the wheel guard 30 is rotated, the right-side rubber damper 35 and the left-side rubber damper 36 are shifted together. That is, according to the present invention, the wheel guard is fixed to arm via elastic members (rubber dampers). Therefore, when the wheel guard is rotated by unforeseen force, collision load applied to the stopper described later can be reduced. In this manner, even when a non-metal material such as aluminum is used as a base material of the wheel guide, it is possible to effectively avoid rotation of the wheel guide exceeding a predetermined rotating angle. Moreover, as the concave-convex portion and the convex-concave portion corresponding to that are provided to the elastic member and the wheel guide, it is possible to prevent slip of the elastic member with respect to the wheel guide.

Figure 4:
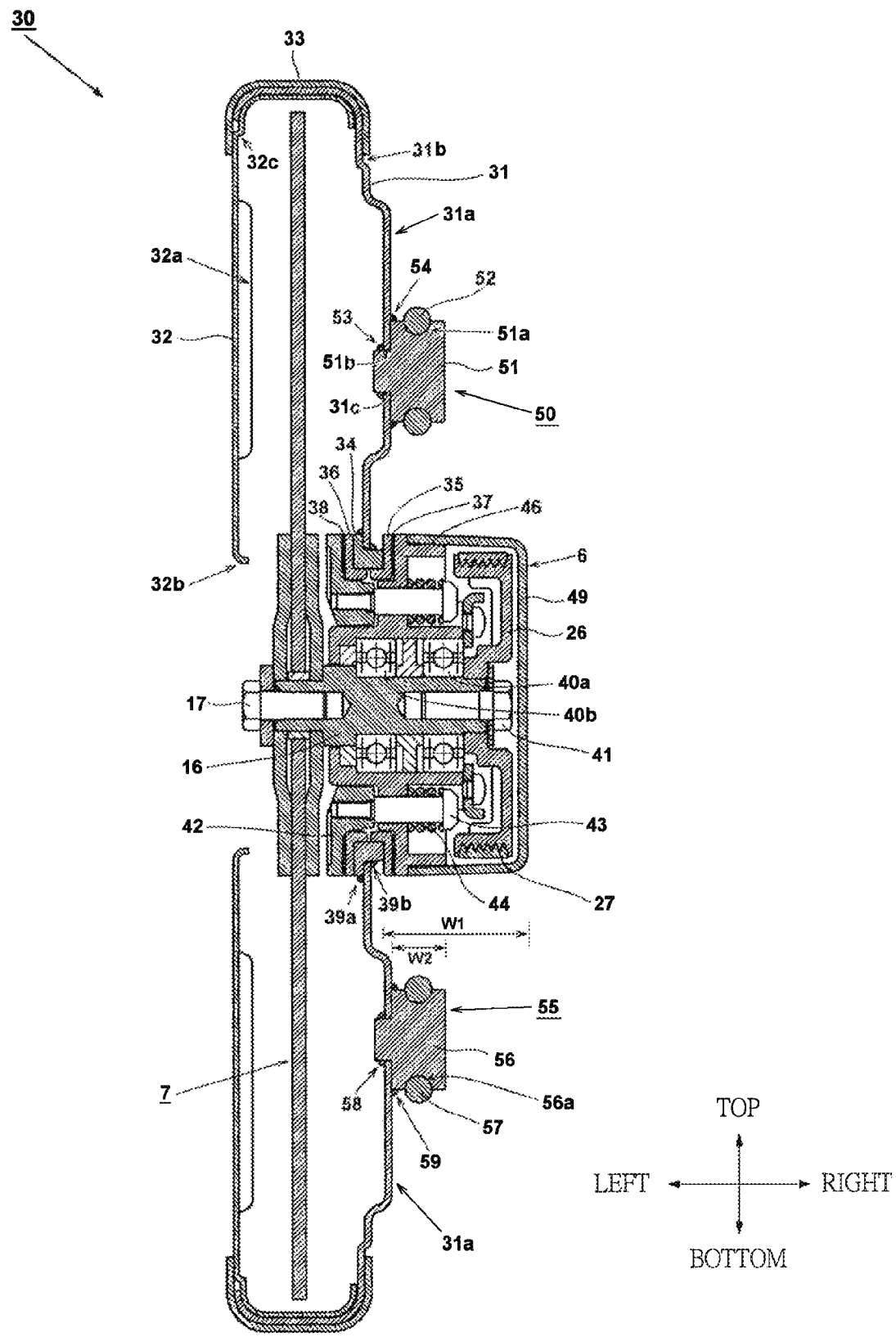
FIG. 4 is a cross-sectional view of a B-B part of FIG. 1.

FIG. 4 is a cross-sectional view of the B-B part of FIG. 1. In FIG. 4, illustration of the angle adjusting lever 18 is omitted. The wheel guard 30 includes the flange 34, the right-side plate 31, the left-side plate 32, and the outer-periphery coupling part 33, and the two stoppers 50 and 55 are attached to the stepped portions 31a of the right-side plate 31. The stoppers 50 and 55 have bushes 51 and 56 serving as base parts in columnar shapes. The annular grooves 51a and 56a, which are annular, are formed on the outer peripheral parts of the bushes 51 and 56 and stopper rings 52 and 57 such as O-rings made of rubber are attached to the annular grooves 51a and 56a. On the left side of each of the bush 51 and the bush 56, a stepped portion is provided as a small-diameter part narrower than the part to which the stopper ring 52 or 57 is attached. The small-diameter parts are inserted into through holes 31c provided in the stepped portions 31a and then welded 53 and 54; as a result, the bush 51 and the bush 56 are firmly fixed to the right-side plate 31. FIG. 4 shoes welded portions of the bush 51, bush 56 and the right-side plate 31 by reference numerals 53, 54, 58 and 59.

The stopper rings 52 and 57 are composed of elastic members such as rubber. When the wheel guard 30 receives unexpected force and is pivoted with respect to the arm 6 during a rotation of the blade 7, the stopper ring 52 or 57 abuts the arm 6 so as to restrict the range of rotation of the wheel guard 30. As is understood from the drawing here, the outer diameters of the stopper rings 52 and 57 are larger than the outer diameters of the bush 51 and the bush 56 of the stopper rings 52 and 57. Therefore, when the wheel guard 30 rotates and collides with the arm 6, the stopper ring 52 or 57 of the stopper 50 or 55 first collides with the arm 6. Since the stopper rings 52 and 57 are composed of the elastic members such as rubber, the shock of the collision can be effectively absorbed. When the energy of the collision of the shock exceeds the absorbability of the stopper ring 52 or 57, the bush 51 or the bush 56 collides with the arm 6 after deformation of the stopper ring 52 or 57. Therefore, the stopper 50 or 55 achieves a sufficient rotation preventing action as a whole. The arm 6 is composed of an arm frame 46 and an arm cover 49 that is made of resin and attached from the outside of the arm frame 46 and covers the belt 27. The width (W1 in FIG. 4) of the contact region of the arm 6 that collides with the wheel guard 30 is larger than the length (W2 in FIG. 2) of projection from the wheel guard 30 of the stopper 50 or 55 toward the right; therefore, the arm cover 49 having weaker strength than that of the arm frame 46 is protected.

The stoppers 50 and 55 are welded with the stepped portions 31a, which are the parts projected from the right-side plate 31 to be close to the arm 6. In this manner, the lengths of the stoppers 50 and 55 may be short (the lengths in the left-right direction in the drawing). Therefore, the bending moment applied to the right-side plate upon collision is small, and the fixing of the stoppers 50 and 55 by the welding 53, 54, 58, and 59 can be enhanced.

The wheel guard 30 is attached to the arm 6 in the following procedure. As shown in FIG. 3, the flange 34 is sandwiched by the right-side rubber damper 35 and the left-side rubber damper 36 and is further sandwiched from both sides by a right-side ring plate and a left-side ring plate 38 made of metal. Next, the above-described members are attached to a stepped portion 46a (see FIG. 5) of the arm frame 46 retaining the arm 6. Then, a plate retainer 42 is attached from the left side to the right side (the side of the arm 6), thereby holding the flange 34, and they are screw-fixed with attachment bolts 43. Only two attachment bolts 43 are shown due to the matter of the position of the cross section; however, stable fixing can be achieved if about two to six bolts are used in accordance with needs. Appropriate tightening force works on the right-side rubber damper 35 and the left-side rubber damper 36 via springs 44 between the attachment bolts 43 and the arm frame 46. Therefore right-side rubber damper 35 and the left-side rubber damper 36 at a degree that does not tighten them more than needed. In this manner, effects of reduction in load and reduction in vibrations upon pivoting of the wheel guard can be effectively achieved.

Further, the right-side ring plate 37 is interposed between the right-side rubber damper 35 and the arm frame 46, and the left-side ring plate 38 is interposed between the left-side rubber damper 36 and the plate retainer 42. Therefore, upon pivoting of the wheel guard 30, sliding occurs between the arm frame 46 and the right-side ring plate 37 and between the plate retainer 42 and the left-side ring plate 38. Therefore, wearing caused by the sliding between the flange 34 and the right-side rubber damper 35 or the left-side rubber damper 36 can be effectively prevented. Similarly, the wearing caused by the sliding between the right-side ring plate 37 and the right-side rubber damper 35 and the wearing caused by the sliding between the left-side ring plate 38 and the left-side rubber damper 36 are prevented.

Figure 5:
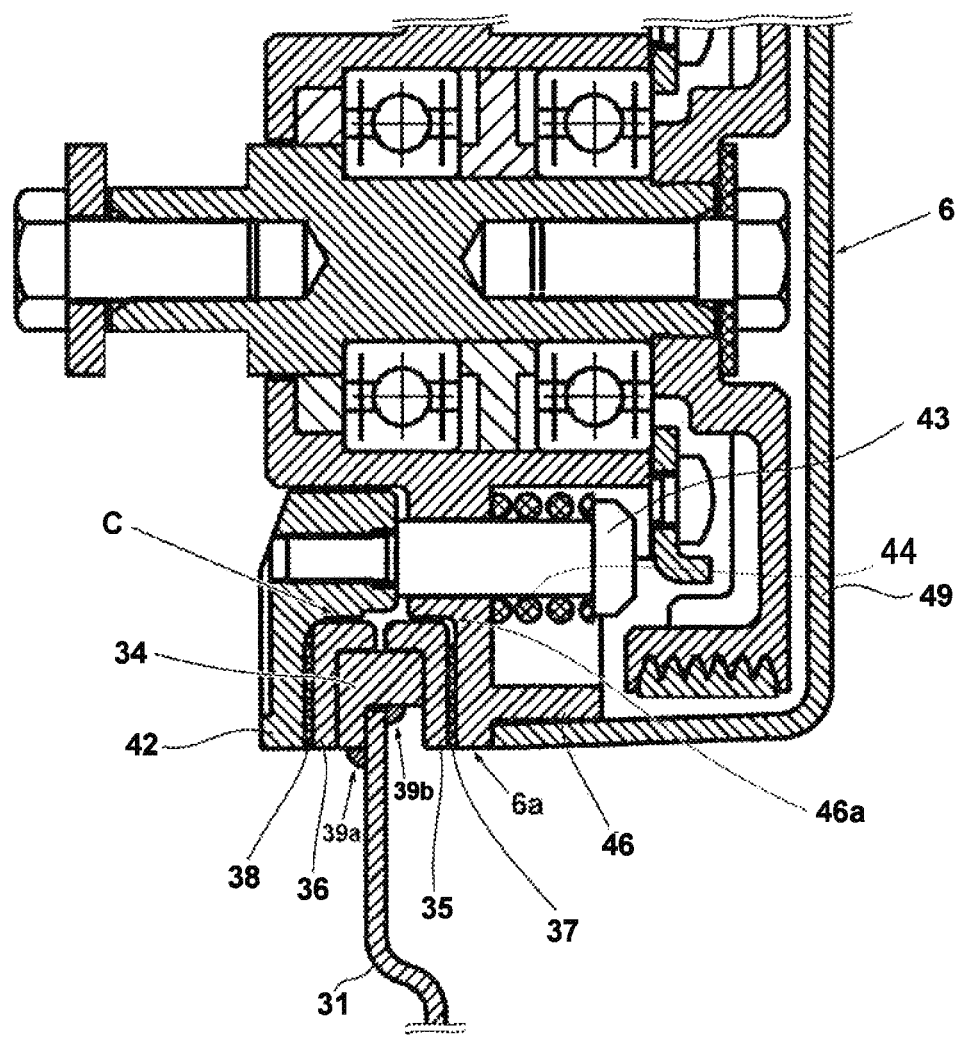
FIG. 5 is an enlarged cross-sectional view of a vicinity of a spindle shown in FIG. 4.

FIG. 5 is an enlarged cross-sectional view of the vicinity of the spindle of FIG. 4. The flange 34 shown in FIG. 3 has a substantially L-shape as a cross-sectional shape and is shaped so that a thick diameter part and a narrow diameter part are connected to each other via a step. The inner diameters of the narrow diameter part and the right-side plate 31 are substantially the same, the circular through hole of the right-side plate 31 is pressed against the stepped portion, and the right-side plate 31 and the flange 34 are fixed by welding. In FIG. 3, positions of welding are shown by the reference numerals 39a and 39b. As illustrated, the amount of projection of the flange 34 with respect to the outer periphery face and the inner periphery face of the right-side plate 31 is larger (higher) than an overlay height of the welding positions 39a, 39b. Therefore, it is not only possible to perform welding easily but also possible to fix the right-side plate 31 and the flange 34 by screws. When fixing the right-side plate 31 and the flange by welding, the flange 34 may be welded through the whole periphery or a plurality of locations may be welded like spots. The fixing of the right-side plate 31 and the flange 34 is not limited to welding, but may be fixing by brazing or an adhesive agent or may be another known fixing method. In this manner, as the right-side plate 31 and the flange 34 can be fixed by welding or other optional method, the wheel guards 30 having different diameters or made of different materials can be easily manufactured with using the common flange 34.

Note that, since a metal ring or the like is not interposed at the contact part (in the vicinity of an arrow C) of the outer peripheral surface of the plate retainer 42 and the inner peripheral surface of the left-side rubber damper 36, they undergo sliding. However, the sliding resistance of this part does not cause a big problem since it is sufficiently small compared with the area of the contact between the left-side ring plate 38 and the plate retainer 42 and the contact surface is in the direction perpendicular to the tightening direction of the attachment bolt 43.

Figure 6:
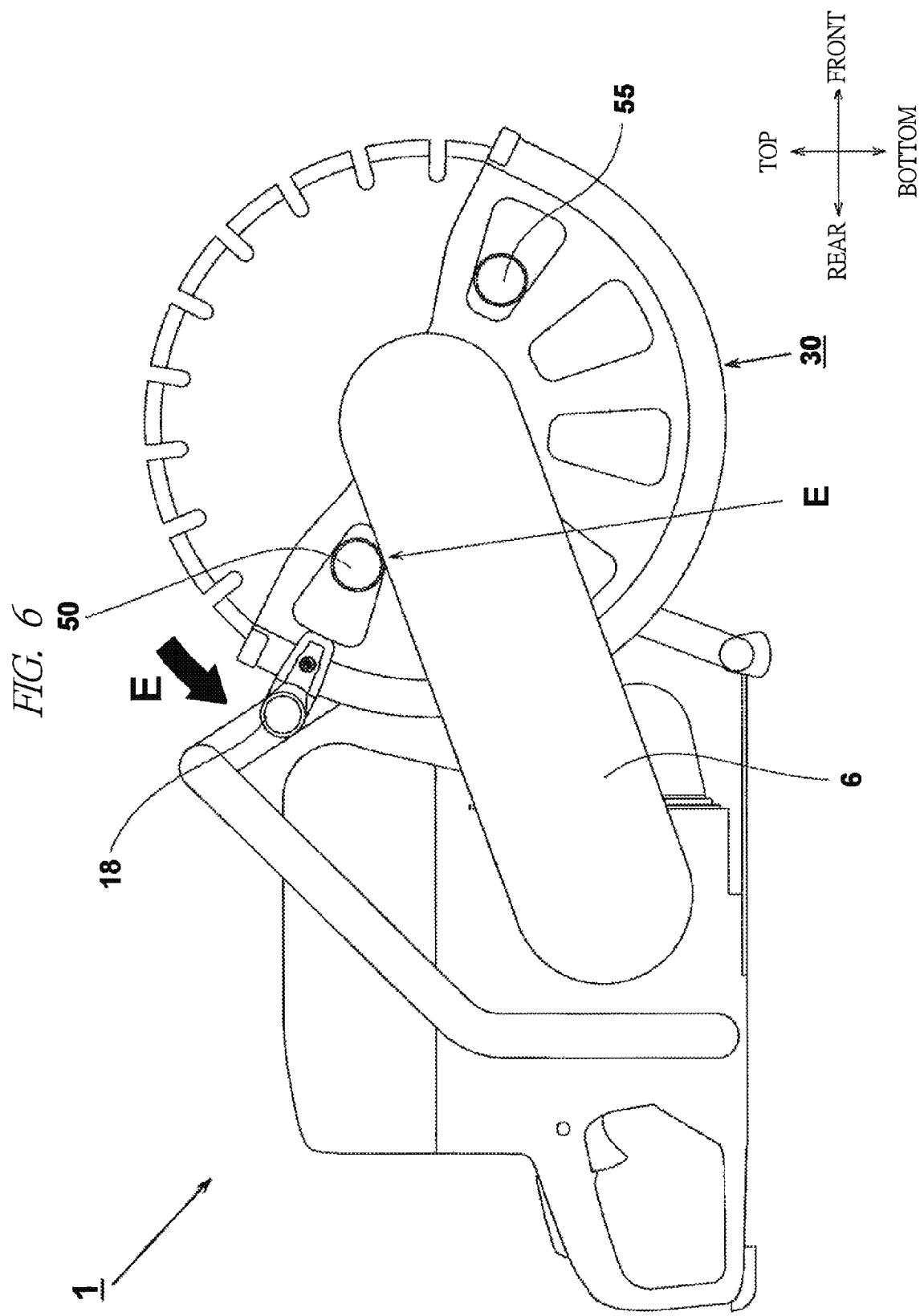
FIG. 6 is a side view of the portable working machine according to the embodiment of the present invention, showing the portable working machine in a normal state.
Figure 7:
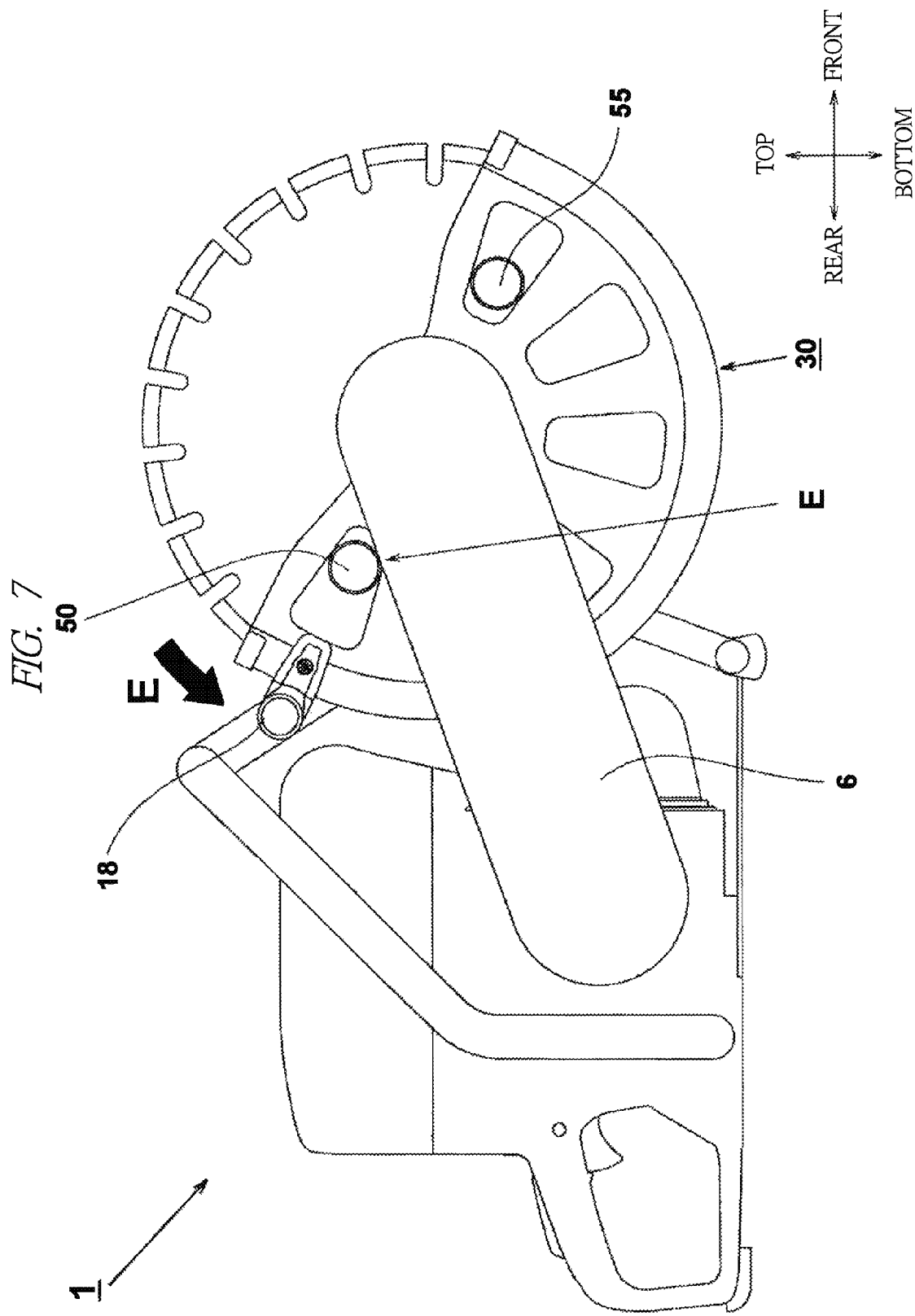
FIG. 7 is a side view showing a state in which the wheel guard of the portable working machine according to the embodiment of the present invention is rotated and brings a stopper into collision with an arm.

Next, the state upon collision between the wheel guard 30 and the arm 6 will be explained with reference to FIGS. 6 and 7. FIG. 6 is a side view of the portable working machine according to the embodiment of the present invention and is a drawing showing a normal state. The wheel guard 30 can be retained at an optional position by moving the angle adjusting lever 18 in the direction of an arrow D. The angle adjusting lever 18 is attached to an optional position on the outer periphery side of the wheel guard 30 by an attachment screw 19. Normally, it is preferable that the movement in the direction of the arrow D is set to require large force so that the wheel guard 30 is not freely moved during operation. If the blade 7 is broken in this state during high-speed rotation, the wheel guard 30 may pivot when large shock load is applied to the wheel guard 30. FIG. 7 shows the state when the wheel guard 30 rotates and the stopper 50 and the arm 6 collide with each other.

When the wheel guard 30 rotates in an E direction and the stopper 50 and the arm 6 collide with each other like illustrated in FIG. 7, first, the stopper ring 52 (see FIG. 4) provided on the outer peripheral surface of the stopper 50 collides with the arm 6. In this process, the shock load is largely reduced by the elastic force of the stopper ring 52 made of rubber. If the shock load is large, not all of the load can be absorbed only by the elastic force of the stopper ring 52, the bush 51 (see FIG. 4) of the stopper 50 and the arm 6 contact each other, and shock load more than that is not applied to the stopper ring 52. Therefore, rupture of the stopper ring 52 caused by collision is effectively prevented. A similar effect can be expected also for the stopper ring 57 of the stopper 55. When the blade 7 is rotated in the state in which the stopper 50 or 55 is in contact with the arm 6, the stopper ring 52 or 57 has the effect of insulating the transmission of vibrations between the wheel guard 30 and the arm 6.

As explained above, in the embodiment of the present invention, a flange of a wheel guard is sandwiched by a rubber dumper and a ring plate and the rubber dumber and the ring plate are fixed to an arm by springs and bolts; therefore, load, vibrations, etc. upon pivoting of the wheel guard can be reduced. In addition, a left-side plate, the flange, and stoppers are welded to the right-side plate and stopper rings are attached to the concave portions of the stoppers. The flange has a hollow cylindrical shape, at least one or more concave portion is formed in the inner peripheral part of the hollow cylindrical shape, and the concave portions of the flange and the convex portions of the rubber dampers fit each other so that the rubber dampers can be moved together when the wheel guard is pivoted. Moreover, since the ring plates are attached between the rubber damper, the arm and the flange, sliding upon pivoting of the wheel guard occurs between the arm and the ring plate and between the flange and the ring plate; therefore, wearing caused by sliding of the rubber damper is prevented. Furthermore, since the stoppers are welded with the convex portions of the right-side plate, the height of the stoppers can be reduced (lower) because of the structure, bending moment is not easily applied to the stoppers, and the welded parts of the stoppers can be firm.

[Second Embodiment]

Figure 8:
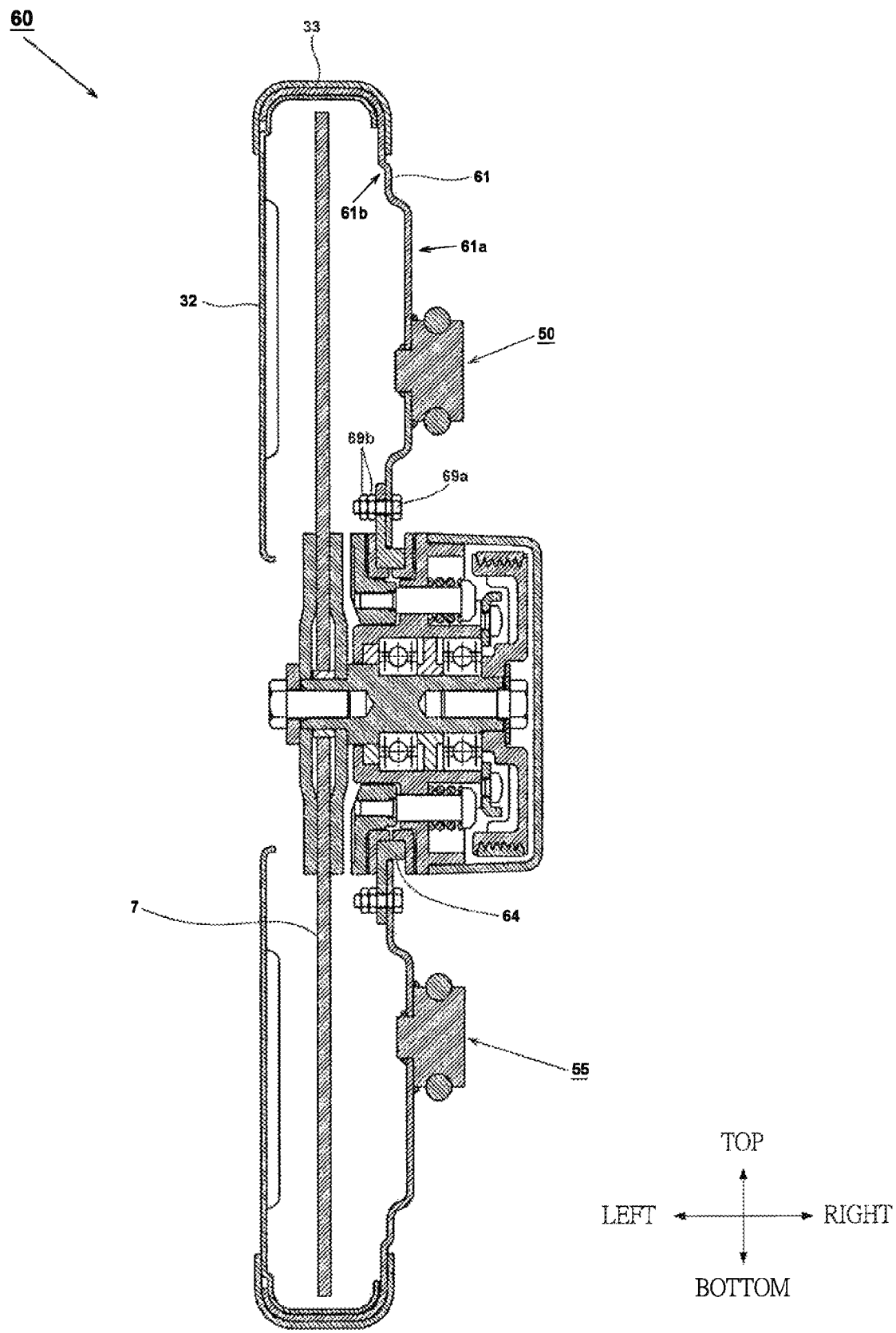
FIG. 8 is a partial cross-sectional view showing a configuration of a wheel guard 60 according to a second embodiment of the present invention.

Next, a second embodiment of the present invention will be explained with reference to FIG. 8. In a wheel guard 60 according to the second embodiment, a right-side plate 61 and a flange 64 composing the wheel guard 60 according to the second embodiment are fixed by bolts 69a and two pieces of nut 69b instead of welding. Therefore, the right-side plate 61 and the flange 64 can be formed of mutually different materials. For example, the flange 64 can be manufactured by an iron-based metal and the right-side plate 61 can be manufactured by a light metal such as an aluminum alloy, resin, and so forth. For example, In this case, the wheel guard 60 can be lighter with maintaining strength of the flange. Moreover, by fixing the right-side plate 61 and the flange 64 with the bolts, the common flange 64 or rubber damper can be utilized even when the wheel guards 60 having various sizes are prepared for blades having different diameters; therefore, cost can be reduced by commoditized of the parts.

Other components are the same as the configuration of the first embodiment, in which the two stoppers 50 and 55 are attached to the through holes provided in the right-side plate 61. In the present embodiment, the right-side plate 61, the stoppers 50 and 55, the bush 51, and the bush 56 are formed of an iron-based material and therefore fixed by welding; however, the method of fixing them is not limited to welding, and another optional fixing method may be used as long as the bush 51 and the bush 56 can be fixed to the right-side plate 61 with sufficient strength.

As described above, according to the second embodiment of the present invention, weight reduction of the wheel guard can be achieved while preventing rotation of the wheel guard when the blade is broken. Furthermore, since the flange and the wheel guard are formed of optional different members, the degree of freedom in terms of designing is increased, and thus the portable working machine which is easy to use can be achieved.

The present invention has been explained above based on the embodiments. However, it is needless to say that the present invention is not limited to the foregoing embodiments and various modifications and alterations can be made within the scope of the present invention. For example, in the embodiments describe above, a stopper has been attached to a wheel guard. However, the stopper is attachable to members other than the wheel guard and the stopper can be attached to an arm, for example. For example, the stopper may be retained by a pin projected from the arm. Of course, when the stopper is attached to the wheel guard (when the stopper is projecting from the wheel guard), the amount of projection of the stopper can be increased without being affected by the distance between the arm and the wheel guard. That is, the amount of contact between the stopper side and the arm side in the axis direction can be large. Therefore, even when there is strain in the attachment structure of the wheel guard or stopper due to shock etc., the stopper surely contacts the arm and the pivoting range can be restricted.

In the above-described embodiments, an engine cutter has been explained as an example of the portable working machines; however, the working machine can be a rotating tool using another drive source such as an electric motor. Furthermore, the working machine is not limited to a cutter, but may be a working machine having a wheel of another rotating type such as round saw or else.

What is claimed is:

1. A portable working machine comprising:
   a drive source;
   a spindle rotating when power of the drive source is transmitted to the spindle;
   an arm supporting the spindle;
   a working wheel fixed to the spindle; and
   a wheel guard partially covering the wheel and capable of moving a fixed position with respect to the arm by a predetermined rotation angle,
   wherein the portable working machine further comprises at least one stopper which is attached to the wheel guard and capable of pivoting with the wheel guard, and
   the stopper is provided in a direction to project from side surfaces of the wheel guard so that a side surface of the stopper abuts onto the arm when the wheel guard pivots and a pivoting range of the wheel guard is restricted.

2. The portable working machine according to claim 1, wherein the stopper is provided to be capable of abutting an upper surface or a lower surface of the arm.

3. The portable working machine according to claim 2, wherein the arm includes:
   an arm frame having a bearing supporting the spindle; and
   a removable arm cover provided to the art frame and on an opposite side of the wheel guard,
   the stopper is abuttable to the arm frame or a region in which the arm cover overlaps with the art frame.

4. The portable working machine according to claim 1, wherein two or more of the stoppers are provided at separate positions in a circumferential direction.

5. The portable working machine according to claim 1, wherein a stepped portion is provided to a side surface of the wheel guard, and
   the stopper is provided to the stepped portion.

6. The portable working machine according to claim 1, wherein an elastic member is further provided to either one of the wheel guard and the arm, and
   the wheel guard and the arm are wound and fixed via the elastic member.

7. The portable working machine according to claim 6, wherein the elastic member is provided to the outer periphery of the stopper.

8. The portable working machine according to claim 7, wherein a groove being successive in a circumferential direction is provided to the outer periphery of the stopper,
   the elastic member is a stopper ring engaged to the groove, and
   the stopper ring and the arm first contact with each other when the wheel guard is pivoted.

9. A portable working machine comprising:
   a drive source;
   a spindle rotating when power of the drive source is transmitted to the spindle;
   an arm supporting the spindle;
   a wheel fixed to the spindle; and
   a wheel guard partially covering the wheel and capable of moving a fixed position with respect to the arm by a predetermined rotation angle,
   wherein the wheel guard is retained by a retaining part of the arm via an elastic member;
   a concave-convex portion is formed on the elastic member;
   a convex-concave portion corresponding to the concave-convex portion is formed on the wheel guard;
   the elastic member and the wheel guard are engaged with each other by the concave-convex portion and the convex-concave portion so as not to relatively rotate; and
   the elastic member is rotated together with the wheel guard when the wheel guard is rotated.

10. The portable working machine according to claim 9, wherein a cylindrical flange in contact with the elastic member is provided in the vicinity of a radially innermost periphery of the wheel guard;

a convex-concave portion is formed on an inner peripheral part of the flange;

the elastic member has a shape covering part of or all of the outer periphery and a lateral side of the flange;

the concave-convex portion corresponding to the convex-concave portion of the flange is formed on an outer peripheral part of the elastic member; and the wheel guard is sandwiched between the arm and an attachment member via the elastic member.

11. The portable working machine according to claim 10, wherein a plate made of metal is interposed in a contact region of the elastic member and the wheel guard; and when the wheel guard is to be relatively moved with respect to the arm, a relative positional relation of any of the elastic member, the plate, and the wheel guard is changed.

12. The portable working machine according to claim 11, wherein the wheel guard includes:

two plates covering both lateral surfaces of the wheel;

a cover portion connecting the two plates; and the flange fixed to either one of the two plates, and the plate and the flange are fixed by welding or bolt fastening.

13. The portable working machine according to claim 12, wherein the amount of projection of the flange with respect to an outer peripheral surface and an inner peripheral surface of the plate is larger than an overlay height of the flange and the plate.

14. The portable working machine according to claim 13, wherein the plate to which the flange is attached is provided with at least two stepped portions, the stepped portion is provided with a stopper restricting a pivoting range of the wheel guard with respect to the arm, and the stopper has a base part and an elastic member attached so as to cover part or all of an outer periphery of the base part.

15. The portable working machine according to claim 14, wherein the base part is provided with a groove being continuous in a circumferential direction, the elastic member is a stopper ring engaged with the groove, and the stopper ring is first brought into contact with the arm when the wheel guard rotates.

16. The portable working machine according to claim 15, wherein an outermost diameter of the base part is smaller than an outermost diameter of the stopper ring.

17. A portable working machine comprising:

a drive source;

a spindle rotating when power of the drive source is transmitted to the spindle;

an arm supporting the spindle;

a working wheel fixed to the spindle; and a wheel guard partially covering the wheel and capable of moving a fixed position with respect to the arm by a predetermined rotation angle, wherein the portable working machine further comprises at least one stopper which is capable of pivoting with the wheel guard, the stopper is provided in a direction to project from side surfaces of the wheel guard so that the stopper and the arm abut when the wheel guard pivots and a pivoting range of the wheel guard is restricted, an elastic member is further provided to either one of the wheel guard and the arm, and the wheel guard and the arm are wound and fixed via the elastic member.

* * * * *